United States Patent [19]

Rognoni

[11] 4,355,925

[45] Oct. 26, 1982

[54] ADJUSTABLE SUPPORT FOR UNDERWATER PIPE DISTANT FROM THE SEA BED

[75] Inventor: Antonio Rognoni, Pavia, Italy

[73] Assignee: Corak Limited, London, England

[21] Appl. No.: 231,037

[22] Filed: Feb. 4, 1981

[30] Foreign Application Priority Data

Feb. 19, 1980 [IT] Italy ................................ 20005 A/80

[51] Int. Cl.³ ............................ F16L 1/04; F16L 3/00
[52] U.S. Cl. .................................... 405/172; 405/158; 248/49
[58] Field of Search ............... 405/154, 156, 157, 158, 405/171–173; 248/49, 55; 138/105, 106; 294/103 R; 137/343, 236, 236 S

[56] References Cited

U.S. PATENT DOCUMENTS

| | | | |
|---|---|---|---|
| 4,017,046 | 4/1977 | Hicks | 248/49 X |
| 4,109,480 | 8/1978 | Sumner | 405/173 |
| 4,147,455 | 4/1979 | Bertaccini | 405/172 |
| 4,252,466 | 2/1981 | Berti et al. | 405/172 |

Primary Examiner—Ernest R. Purser
Assistant Examiner—Nancy J. Pistel

Attorney, Agent, or Firm—Morgan, Finnegan, Pine, Foley & Lee

[57] ABSTRACT

The invention relates to an adjustable support particularly suitable for underwater pipe lying a substantial distance from the sea bed. The structure of the support is simpler and is easier to manuever than known structures, and includes two parts. The lower part has a tubular frame with a square or rectangular base provided with four slidable vertical legs of variable length carrying support plates at their lower ends which are adaptable to the slope of the sea bed. The upper part has a slab on which there is disposed a fixed half saddle with its upper part in the form of a hook, and a slidable half saddle which, by means of release and locking devices, can be brought into contact with the fixed half saddle to form a semicircular support base for the pipe. The upper and lower parts of the support are connected together by means of two hydraulic jacks and four inclined telescopic legs; it being possible to insert, between the support base for the jacks and inclined telescopic legs and the lower part, grid structures of greater or lesser height, depending on the distance of the pipe from the sea bed.

13 Claims, 6 Drawing Figures

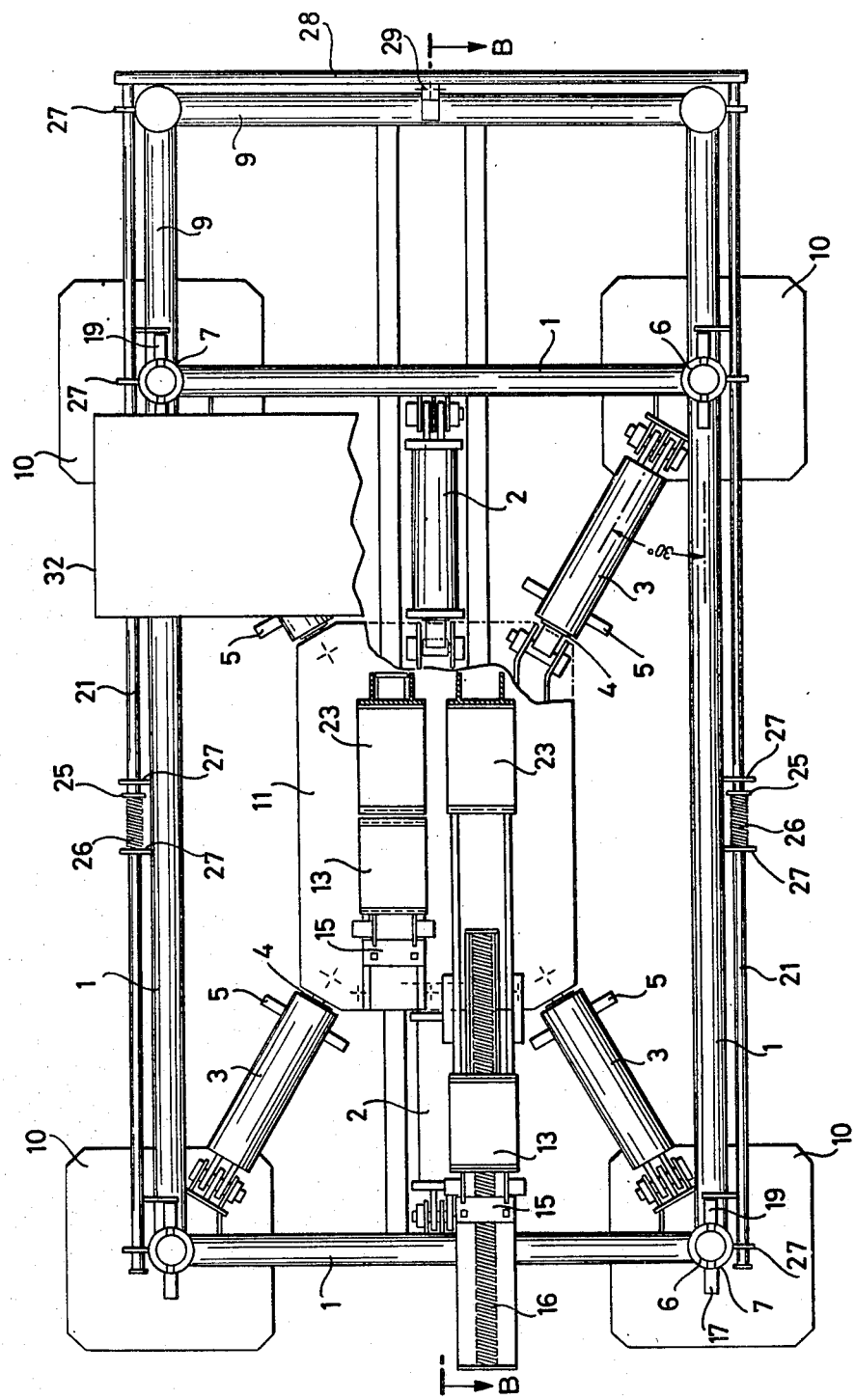

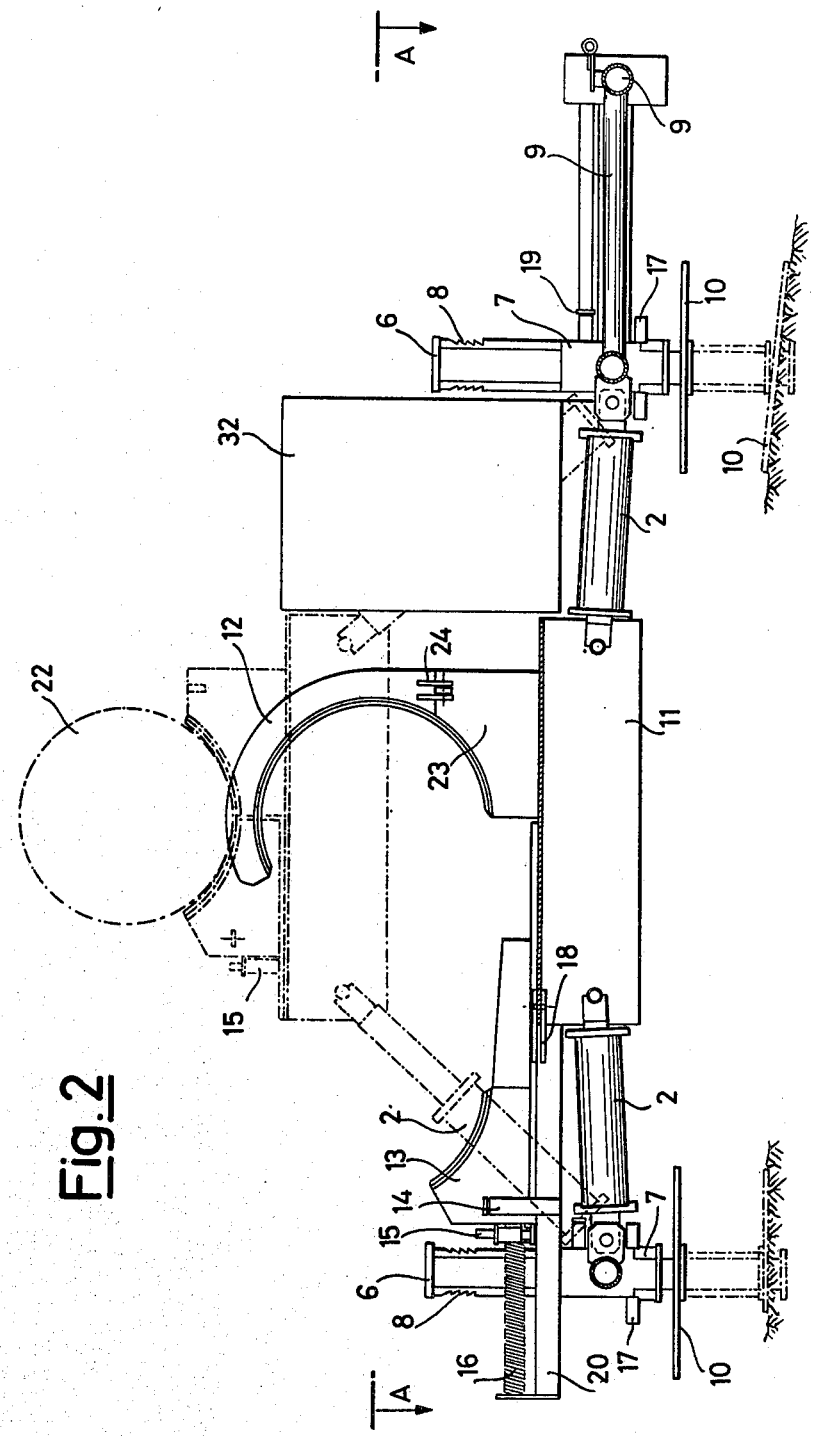

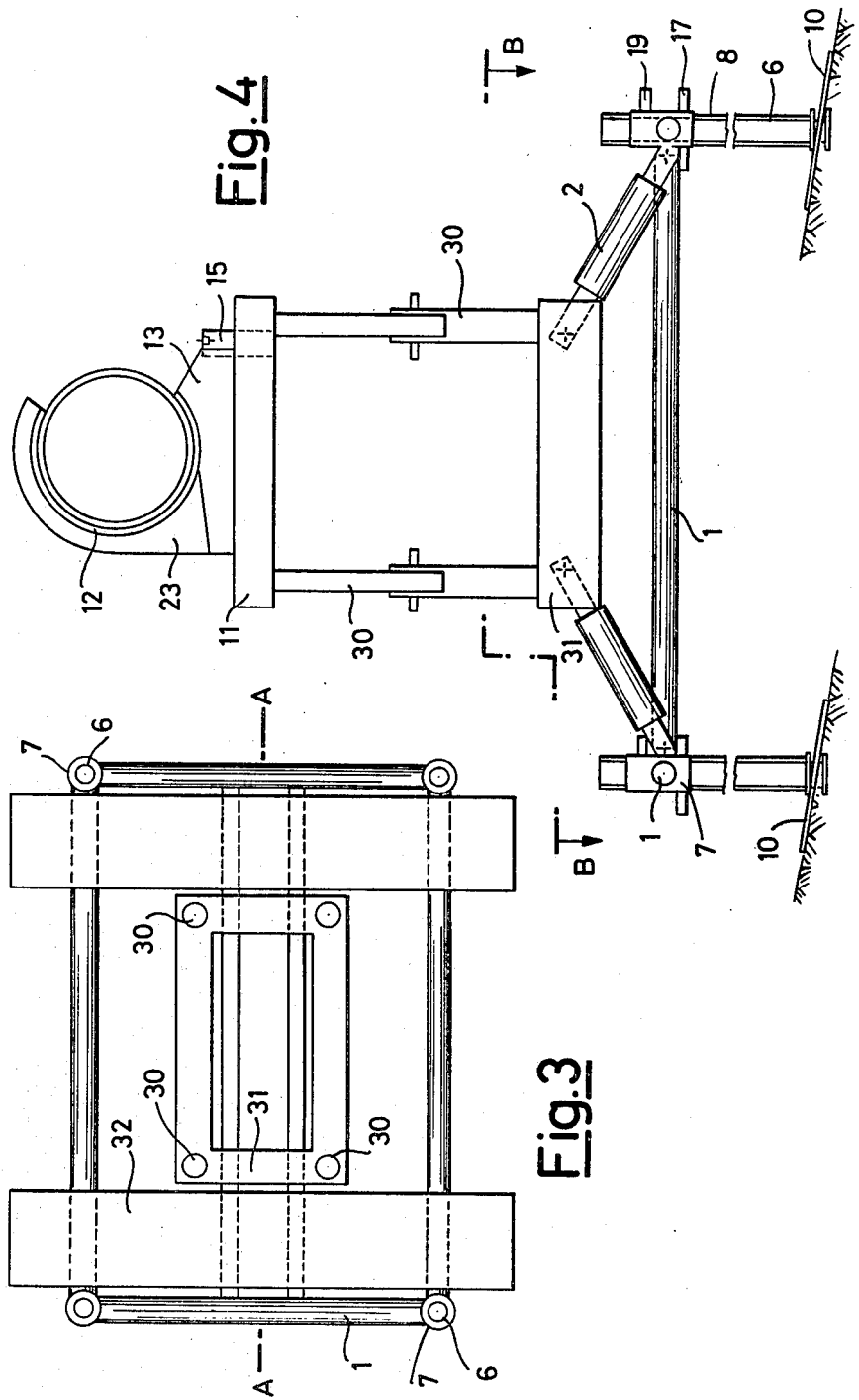

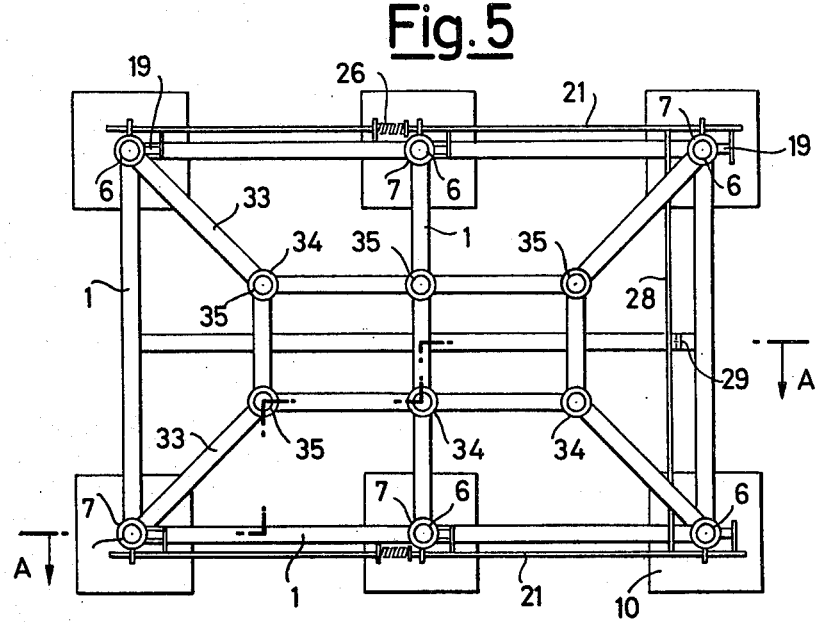
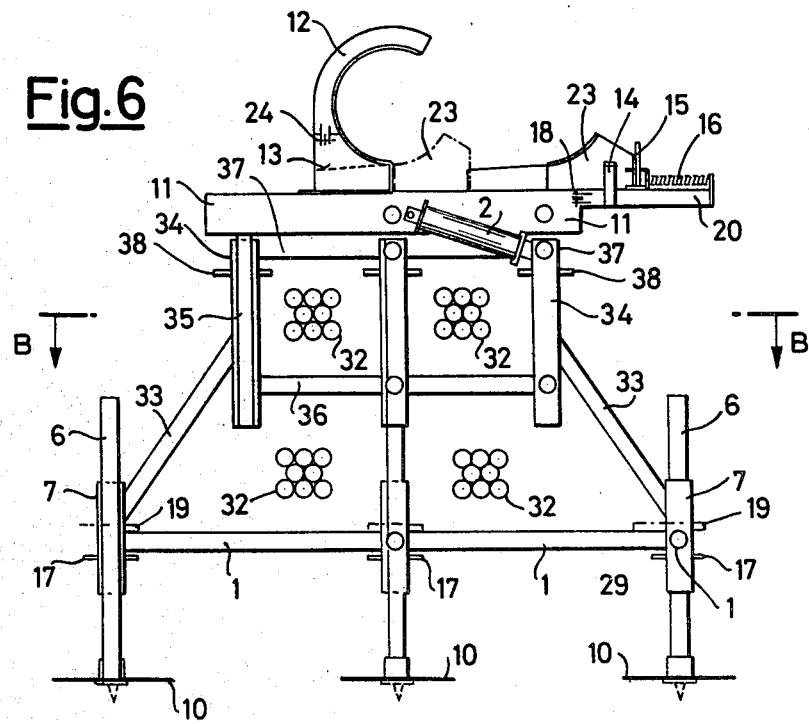

ADJUSTABLE SUPPORT FOR UNDERWATER PIPE DISTANT FROM THE SEA BED

This invention relates to a simplified adjustable support for underwater pipe located a substantial distance from the sea bed, and preferably greater than at least 80 cm.

U.S. Pat. Ser. No. 081,489 filed on Oct. 3, 1979, now U.S. Pat. No. 4,252,466, describes an adjustable support which enables underwater pipe to be supported at whatever the distance from the sea bed. However, it has a rather complicated structure and requires numerous operations for its installation. Moreover, once it has been installed, and its upper part released and recovered from the rest of the support, there remains four support legs fitted with racks on the sea bed projecting above the pipe the tops of the teeth of which can tear fishermen's nets.

A new type of support, constituting the subject matter of the present invention, has been discovered which enables the aforesaid drawbacks to be obviated and its installation to be simplified and reduced.

BRIEF DESCRIPTION OF THE DRAWINGS

FIG. 1 is a horizontal section through said support taken on the line AA of FIG. 2;

FIG. 2 is a vertical section through the same support taken on the line BB of FIG. 1;

FIG. 3 is a horizontal section through a modification of said support on the line BB of FIG. 4;

FIG. 4 is a vertical section through the same modification taken on the line AA of FIG. 3;

FIG. 5 is a horizontal section through a further modification of the said support taken on the line BB of FIG. 6; and FIG. 6 represents a vertical section through the same modification on the line AA of FIG. 5.

DETAILED DESCRIPTION OF THE PREFERRED EMBODIMENT

With reference to FIGS. 1 and 2, the support according to the present invention comprises:

(1) a tubular frame 1 with a square or rectangular base provided with four vertical legs 6 slidable in guide tubes 7, and having two opposing gullet toothed racks 8 welded on each leg 6.

(2) four support plates 10 fixed to the lower ends of the four legs 6 in such a manner that they can adapt to the slope of the sea bed;

(3) two hydraulic jacks 2 connected at their lower end to two opposite sides of the frame 1 and at their upper ends to two opposite sides of the slab 11 disposed above the frame 1, the axes of said jacks changing their contained angle as said slab 11 rises;

(4) four inclined telescopic legs hinged at their lower ends to the four corners of the frame 1 and at their upper ends to the four corners of the slab 11, each leg having two coaxial tubes, namely an outer tube 3 and an inner tube 4 slidable in the first and along which are welded two opposing gullet toothed racks;

(5) four devices for locking the inclined telescopic legs, including stops 5 which when inserted into the rack teeth, enable the legs to slide upwards, but prevent them from sliding downwards;

(6) four devices for locking the vertical legs 6 including stops 17 which, when inserted into the teeth of the racks 8, enable the legs 6 to slide downward but prevent them from sliding upwards;

(7) a release system for the vertical legs 6, including two parallel rods 21 connected rigidly at their ends to the pins 19 which when inserted between the teeth of the racks 8 serve to retain the legs 6 before installation of the support.

The two rods 21, fitted with two collars 25 against which the springs 26 are pressed, can slide in the guides 27 and are connected together by a rod 28 held at rest by the hook 29 fixed to one side of the tubular frame 1. On raising the hook 29, the system, comprising the rods 21 and pins 19, is urged towards the right by the reaction of the springs 26, and simultaneously releases the vertical legs 6;

(8) a block of floating material 32 hooked to the tubular frame and recoverable after the support has been positioned under the pipe, wherein the block 32, as shown, is offset from the center of gravity of the frame 1 to accomodate the slab 11;

(9) a tubular counterweight 9 which, as shown, is connected to the end of the frame 1 adjacent the float 32 for balancing the upward thrust of the float 32; and

(10) a hooking system for supporting the pipe 22 including one or more half saddles 23 with their upper part 12 in the form of a hook, and fixed to the slab 11, and one or more slidable half saddles 13 resting on the extension 20 of the slab 11. The extensions 20 are provided with release devices 14 and stop devices 15 which, after the slidable half saddles 13 have been released by the devices 14 and have been moved towards the fixed half saddles 23 under the thrust of the spring 16, have the task of keeping the slidable half saddles 13 clamped against the pipe 22 hooked to the fixed half saddles 23 by hooks 12. A device 18 is also provided for releasing the extension 20 of the slab 11 and leaving it abandoned on the sea bed after the slidable half saddles 13 have been released from it, and a device 24 by means of which the upper part of hook 12 is released and recovered.

The operation involved in installing the support under the pipe 22 to be supported is much simpler and more rapid than those necessary in the case of other types of known supports. The support according to the present invention is prepared on shore or on the depot ship so that the vertical legs 6 have more or less the length which is predicted to be necessary for the distance from the sea bed of the pipe to be supported. The support, loaded with the block of floating material 32 in such a manner that the entire unit has a positive residual weight in water, is lowered on to the sea bed in proximity to the point where installation is scheduled. The support is then taken over by a submarine or divers, and hooked to the pipe by means of the hook 12 of the fixed half saddle 23. On operating the release device 14 for the slidable half saddle 13, it becomes inserted into the appropriate seat provided in the lower part of the fixed half saddle 23 under the action of the spring 16, and remains clamped against the pipe 22 by means of the automatic stop device 15. The extension 20 of the slab 11 is released by means of the device 18 and abandoned.

By means of the release system described under paragraph 7, the legs 6 become simultaneously released, and because of their weight they become driven into the sea bed below the support plates 10, which are inclined according to the configuration of the sea bed.

The locking devices constituted by the stops 17 prevent the legs 6 from sliding upwards, and thus lock them in the position attained.

The block of floating material 32 is released, and is recovered and used for other supports.

On operating the jacks 2, these lift the slab 11 and the four telescopic legs hinged to it from their initial or lower position shown by solid lines in FIG. 1. The upward movement of the slab 11 causes the two half saddles 13 and 23 and the pipe 22 resting on it to move in the same direction.

This movement continues until the pipe 22 is lifted by the amount necessary to eliminate the sag due to bending, and the stops 5 automatically lock the inclined telescopic legs in the raised position attained and as shown by the phantom lines in FIG. 1.

If the vertical legs 6 remain suspended over the sea bed, the action of the jacks 2 first thrusts the legs against the sea bed, and then raises the pipe 22, using as their support point the frame 1, which because of the locking devices 17 cannot move downwards.

Finally, the upper part 12 of the half saddle 23 is released by means of the device 24 and recovered.

FIGS. 3,4 and 5,6 show two modifications of the described support, which differ from it only in that grid structures are inserted between the slab 11 which supports the half saddles and the base frame 1, to increase the height of the support, and in that the base frame 1 is widened to increase the support surface.

In this respect, the support shown in FIGS. 3 and 4 differs from the preceding in that the upper ends of the jacks 2 and of the inclined telescopic legs are connected to a lower slab 31 which, in turn, is connected to the upper slab 11 by means of four vertical legs 30, which are similar to the vertical legs 6 for the base frame 1. The length of said legs 30 can be adjusted according to the height required by the support.

The support shown in FIGS. 5 and 6 differs from the other embodiments described herein in that the base frame 1 has six legs 6 connected to the upper structure by means of six fixed struts 33. The upper structure is formed from two horizontal tubular frames, namely a lower frame 36 and an upper frame 37 connected together by six guide tubes 34 to which the struts 33 are welded, and in which there slide six legs 35. The legs 35 are fitted with racks and rigidly connected to the slab 11 which supports the two half saddles 13 and 23. The slab 11 is raised by the two jacks 2 which are connected at their ends to the frame 37 and slab 11. Instead of the blocks of floating material attached to the preceding supports, in this third type there are floating balls 32 which are either left in situ or evacuated.

The procedure for installing the support is as in the first case, i.e. the support is secured to the pipe 22 to be supported by means of the hooks 12 of the fixed half saddles 23. The slidable half saddle 13 is released by means of the release device 14, and becomes inserted in the fixed half saddle 23 and remains locked against the pipe by means of the locking device 15. The cross or extension member 20 is released by means of the release device 18 and is abandoned, the legs 6 are released by means of the pins 19 of the automatic release device, and under their own weight fall to the sea bed and are driven therein to remain locked there by the effect of the stop pins 17, the jacks 2 are operated to raise the pipe 22 by the amount necessary to eliminate the sag due to bending, the stops 38 lock the legs 35 in their attained position, the upper part 12 of the half saddle 23 is released by means of the device 24, and the pipe remains resting only on the two half saddles 13 and 23.

I claim:

1. In an adjustable support for underwater pipe located at a substantial distance from the sea bed, preferably greater than at least 80 cm, the improvement comprising:
   (a) a frame having a base with parallel segments and intersecting portions, guide tubes at said intersecting portions, and vertical legs slidable in said tubes;
   (b) support plate means attached to the lower ends of said vertical legs adaptable to the slope of the sea bed;
   (c) a system connected to the frame which includes stops that engage and releasably lock said vertical legs against movement until the support is lowered to the sea bed, and release means connected to said stops that disengage them from and allow said legs to move downwardly to the sea bed;
   (d) insertable means separate from said release system for engaging said vertical legs at a point spaced from said release system which allow said legs, when engaged by said insertable means, to slide only in a downward direction;
   (e) a slab within the perimeter of said base frame adapted to be raised and lowered relative thereto;
   (f) a pair of hydraulic jacks which are connected to their outer ends to opposing points of the parallel segments of said frame base and which extend inwardly and are connected to said slab at their inner ends, wherein said jacks are adapted to raise and lower said slab;
   (g) a plurality of inclined telescopic legs for supporting said slab which are hinged at their lower ends to said corner portions of the frame and which are hinged at their upper ends to said slab, and wherein said legs move in a telescopic manner as said jacks raise and lower said slab;
   (h) means for locking said legs in their extended position when said slab is raised by said jacks;
   (i) a float releasably connected to the frame which provides a positive residual weight to the support as it is lowered to the sea bed, whereupon said float is adapted to be released from the frame; and
   (j) a saddle system, including one-half of a saddle fixed on said slab which has a hook on its upper portion adapted to hook the pipe to be supported after the support is on the sea bed and positioned below the underwater pipe and said jacks have raised said slab toward the pipe so that said hook can releasably engage the pipe and said saddle system can support and lift the pipe to eliminate bending thereof, and another half of a saddle opposing said fixed one-half and adapted to slide on said slab under the pipe and engage and be clamped to said fixed one-half for supporting and lifting the pipe thereon.

2. The adjustable support of claim 1, wherein the frame is tubular, and said base is a square resting on four corner plates.

3. The adjustable support of claim 1, wherein the frame is tubular, and said base is a rectangle resting on four corner plates.

4. The adjustable support of claim 1, wherein said vertical legs include opposing racks having teeth, and wherein said insertable means engage said teeth of said racks to enable the legs to slide downwards, but to prevent them from sliding upwards.

5. The adjustable support of claim 1, wherein there are four telescopic legs for supporting said slab, and wherein each leg comprises outer and inner coaxial tubes, the outer one of which is hinged to the frame and the inner one of which slides within said outer tube and is hinged to said saddle, and wherein said telescopic leg means engage said leg to prevent relative movement between said tubes when said leg is in its extended position.

6. The adjustable support of claim 1, wherein said float is releasably hooked to said frame at a point offset from the center of gravity thereof to accomodate the position of said slab and saddle system, and wherein the support includes a counterweight secured to the frame adjacent said offset float to balance the upward thrust thereof.

7. The support of claim 1, wherein said means connecting said hook to said fixed half of said saddle is adapted to release said hook therefrom when the underwater pipe is supported by the saddle.

8. The support of claim 1, wherein said saddle system includes an extension connected to said slab on which is releasably secured said slidable half of said saddle, and wherein said slidable half includes a device for releasing said slidable half, and a device connected to said slidable half which clamps said slidable half when it has engaged said fixed half.

9. The support of claim 8, wherein said extension includes means for securing said extension to said slab adapted to release the extension therefrom after the slidable half of said saddle has engaged said fixed half of said saddle.

10. The adjustable support of claim 1, wherein said slab has a grid structure depending therefrom to increase its height and said jacks are connected to said grid structure.

11. An adjustable support for underwater pipe located at a substantial distance from the sea bed, preferably greater than at least 80 cm, comprising:
 (a) a tubular frame having a four-sided base with parallel sides and intersecting 90 degree corners, four vertical guide tubes at said intersecting corners, and four vertical legs slidable in said tubes having opposing racks of teeth on the upper portions of each leg and a support plate attached to the lower end thereof adaptable to the slope of the sea bed;
 (b) a system connected to the frame which includes stops that engage and releasably lock said vertical legs against movement until the support is lowered to the sea bed, and release means connected to said stops that disengage them from and allow said legs to move downwardly to the sea bed;
 (c) pins insertable in the teeth of said vertical legs to allow said legs to slide only in a downward direction;
 (d) a slab within the perimeter of said base frame adapted to be raised and lowered relative thereto;
 (e) a pair of hydraulic jacks which are connected at their outer ends to opposing sides of said frame base and which extend inwardly and are connected to said slab at their inner ends, wherein said jacks are adapted to raise and lower said slab;
 (f) four inclined telescopic legs for supporting said slab which are hinged at their lower ends to said corners of said frame base and which are hinged at their upper ends to said slab, and wherein said legs move in a telescopic manner as said jacks raise and lower said slab;
 (g) means for locking said legs in their extended position when said slab is raised by said jacks;
 (h) a float releasably connected to the frame which provides a positive residual weight to the support as it is lowered to the sea bed, whereupon said float is adapted to be released from the frame; and
 (i) a saddle system, including a plurality of saddles, each of which has one-half fixed on said slab with a hook on its upper portion adapted to hook the pipe to be supported after the support is on the sea bed and positioned below the underwater pipe and said jacks have raised said slab toward the pipe so that said hook can releasably engage the pipe and said saddles can support and lift the pipe to eliminate bending thereof, and another one-half opposing said fixed one-half adapted to slide on said slab under the pipe and engage and be clamped to said fixed one-half for supporting and lifting the pipe thereon.

12. In an adjustable support for underwater pipe located at a substantial distance from the sea bed, preferably greater than at least 80 cm, the improvement comprising:
 (a) a frame having a base with parallel segments and intersecting portions, guide tubes at said intersecting portions, and vertical legs slidable in said tubes;
 (b) support plate means attached to the lower ends of said vertical legs adaptable to the slope of the sea bed;
 (c) a system connected to the frame which includes stops that engage and releasably lock said vertical legs against movement until the support is lowered to the sea bed, and release means connected to said stops that disengage them from and allow said legs to move downwardly to the sea bed;
 (d) insertable means separate from said release system for engaging said vertical legs at a point spaced from said release system which allow said legs, when engaged by said insertable means, to slide only in a downward direction;
 (e) a pair of slabs within the perimeter of said base frame adapted to be raised and lowered, wherein said slabs are spaced apart by vertically adjustable legs connected therebetween;
 (f) a pair of hydraulic jacks which are connected at their outer ends to opposing points of the parallel segments of said frame base and which extend inwardly and are connected to said lower slab at their inner ends, wherein said jacks are adapted to raise and lower said slabs; and
 (g) a saddle system, including one-half of a saddle fixed on said upper slab which has a hook on its upper portion adapted to hook the pipe to be supported after the support is on the sea bed and positioned below the underwater pipe and said jacks have raised said slabs toward the pipe so that said hook can releasably engage the pipe and said saddle system can support and lift the pipe to eliminate bending thereof, and another one-half of a saddle opposing said fixed one-half and adapted to slide on said upper slab under the pipe and engage and be clamped to said fixed one-half for supporting and lifting the pipe thereon.

13. In an adjustable support for underwater pipe located at a substantial distance from the sea bed, preferably greater than at least 80 cm, comprising:

(a) a tubular frame having a base with parallel sides and intersecting 90 degree corners, guide tubes secured at said intersecting corners and along said parallel sides, and vertical legs slidable in said tubes;

(b) support plate means attached to the lower ends of said vertical legs adaptable to the slope of the sea bed;

(c) a system connected to the frame which includes stops that engage and releasably lock said vertical legs against movement until the support is lowered to the sea bed, and release means connected to said stops that disengage them from and allow said legs to move downwardly to the sea bed;

(d) insertable means separate from said release system for engaging said vertical legs at a point spaced from said release system which allow said legs, when engaged by said insertable means, to slide only in a downward direction;

(e) a pair of tubular horizontal frames within the perimeter of said base frame interconnected by vertical guide tubes in which adjustable legs slide to raise and lower said upper frame relative to said lower horizontal frame;

(f) struts secured to and extending inwardly from said tubular base to said interconnecting guide tubes, wherein said struts are secured thereto;

(g) a slab within the perimeter of said base frame and secured onto said upper horizontal tubular frame;

(h) a pair of hydraulic jacks connected at their outer ends to opposing portions of said upper horizontal tubular frame which extend inwardly and are connected to said slab at their inner ends, and wherein said jacks are adapted to raise and lower said slab;

(i) float means in the spaces between said frames which provide a positive residual weight to the support as it is lowered to the sea bed; and (j) a saddle system, including one-half of a saddle fixed on said slab which has a hook on its upper portion adapted to hook the pipe to be supported after the support is on the sea bed and positioned below the underwater pipe and said jacks have raised said slab toward the pipe so that said hook can releasably engage the pipe and said saddle system can support and lift the pipe to eliminate bending thereof, and another one-half of a saddle opposing said fixed one-half adapted to slide on said slab under the pipe and engage and be clamped to said fixed one-half for supporting and lifting the pipe thereon.

* * * * *